E. STRASMA.
DISK SHARPENING MACHINE.
APPLICATION FILED NOV. 18, 1913.
1,189,013.
Patented June 27, 1916.
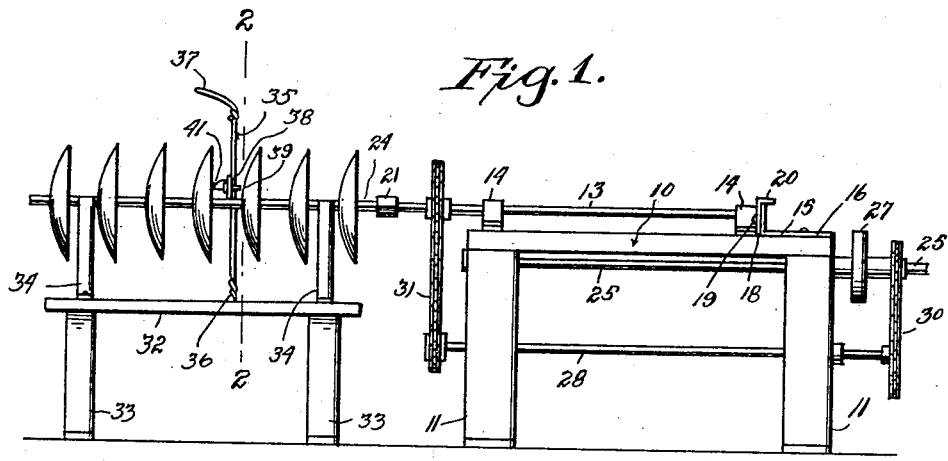
Fig. 1.
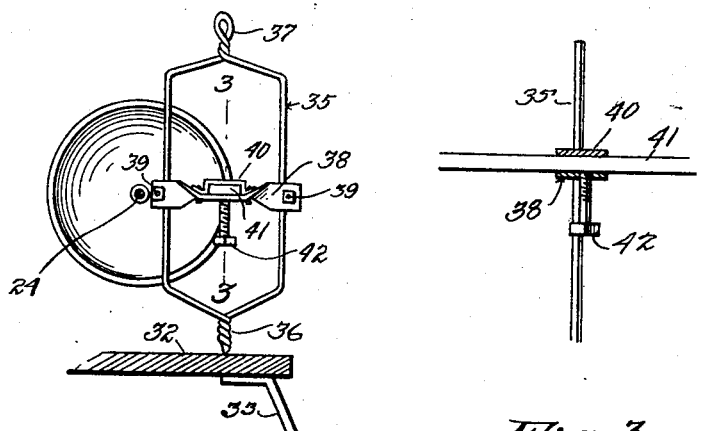
Fig. 2.
Fig. 3
Inventor
E. Strasma
Attorney
Witnesses

UNITED STATES PATENT OFFICE.

EDWARD STRASMA, OF GILMAN, ILLINOIS.

DISK-SHARPENING MACHINE.

1,189,013. Specification of Letters Patent. Patented June 27, 1916.

Application filed November 18, 1913. Serial No. 801,658.

*To all whom it may concern:*

Be it known that I, EDWARD STRASMA, a citizen of the United States, residing at Gilman, in the county of Iroquois, State of Illinois, have invented certain new and useful Improvements in Disk-Sharpening Machines; and I do hereby declare the following to be a full, clear, and exact description of the invention, such as will enable others skilled in the art to which it appertains to make and use the same.

This invention relates to disk sharpening machines and has for an object to provide a novel power shaft which may be easily and quickly engaged and disengaged from the disk shaft.

A further object is to provide novel means for sharpening the disks.

With the above objects in view the invention consists of certain novel details of construction and combination of parts hereinafter fully described and claimed, it being understood that various modifications may be made in the minor details of construction within the scope of the appended claim.

In the accompanying drawings illustrating this invention:—Figure 1 is a side elevation showing a disk sharpening machine embodying my improvements. Fig. 2, is a transverse section on the line 2—2 of Fig. 1, and Fig. 3, a section on the line 3—3 of Fig. 2.

Referring now to the drawings in which like characters of reference designate similar parts, the device is shown to comprise a platform 10 that is supported by legs 11 at the ends. A driven shaft 13 is journaled and slidably fitted in bearings 14 disposed on top of the platform. An angle iron plate 15 is fixed to the platform. A latch in the nature of a plate 18 is hinged as shown at 19 on said plate to form an abutment for the end of the shaft, the plate being bent outwardly at the top edge as shown at 20 to produce a stop which upon swinging down of the plate bears upon the top edge of the angle iron plate 15 and limits downward movement of the latch, while at the same time providing a grip by means of which the latch may be swung open or closed. The opposite end of the driven shaft is equipped with a socket 21 to receive the disk shaft 24. The disk shaft is held revolubly as will presently be described in alinement with the driven shaft, and to couple the driven shaft to the disk shaft in order to rotate the latter, the driven shaft which is normally slid back through the opening 17 in the angle iron plate, is slid forwardly until the socket 21 engages with the end of the disk shaft, the latch 18 being then closed to hold the driven shaft slid forwardly whereby to maintain the socket in engagement with the disk shaft. After the disks have been sharpened, the latch is rocked open and the driven shaft slid back to disengage the socket from the disk shaft. It will thus be evident that I have provided an extremely simple and quick means for operatively connecting the driven and disk shafts.

For actuating the power shaft a shaft 25 is journaled on the bottom of the platform and is equipped with a drive pulley 27 which may be operatively connected to any desired motive power. This shaft rotates a second shaft 28, there being a chain drive 30 operatively connecting these shafts. A second chain drive 31 connects the shaft 28 with the driven shaft 13.

My invention further includes a means for supporting the disk shaft 24 in alinement with the power shaft, such means including a platform 32 that is supported upon legs 33 and is equipped on its top face with bearings 34 which receive the disk shaft 24. These bearings revolubly hold the disk shaft in alinement with the driven shaft.

For sharpening the disks I provide a substantially oblong frame 35 that is provided at the bottom with a central projection 36 and is provided at the top with a laterally directed grip 37. A cross bar 38 is adjustably secured at the ends to the sides of the frame by means of hook bolts 39, and carries a central strap bracket 40 in which the sharpening element 41 is secured by means of a set screw 42. This device is operated by hand, the operator gripping the handle or grip 37 in one hand and positioning the projection upon the platform 32 in such a manner that the sharpening edge of the sharpening element 41 bears upon the edge of the disk whereby during rotation the disk is sharpened.

From the above description it will be seen that I have provided an extremely simple and inexpensive device of the character described which may be constructed of a few parts that are effective in operation and will not easily get out of order.

What is claimed, is:—

A disk sharpener comprising a frame having side members formed from a single length of wire and having the intermediate portion of one end twisted and bent laterally to form a handle and the intermediate portion of its other end twisted and the outer terminal of the twisted portion sharpened to form a prong, a cross bar having its terminals slidably engaged with the side members of the frame, and a sharpening element adjustably mounted on said cross bar, for movement in a plane at right angles to the plane of the frame.

In testimony whereof, I affix my signature, in the presence of two witnesses.

EDWARD STRASMA.

Witnesses:
R. M. POLLOCH,
EVA L. ROUR.

Copies of this patent may be obtained for five cents each, by addressing the "Commissioner of Patents, Washington, D. C."